July 15, 1930. W. C. WARD 1,770,638
BUFFER FOR AIRCRAFT
Filed Jan. 9, 1928
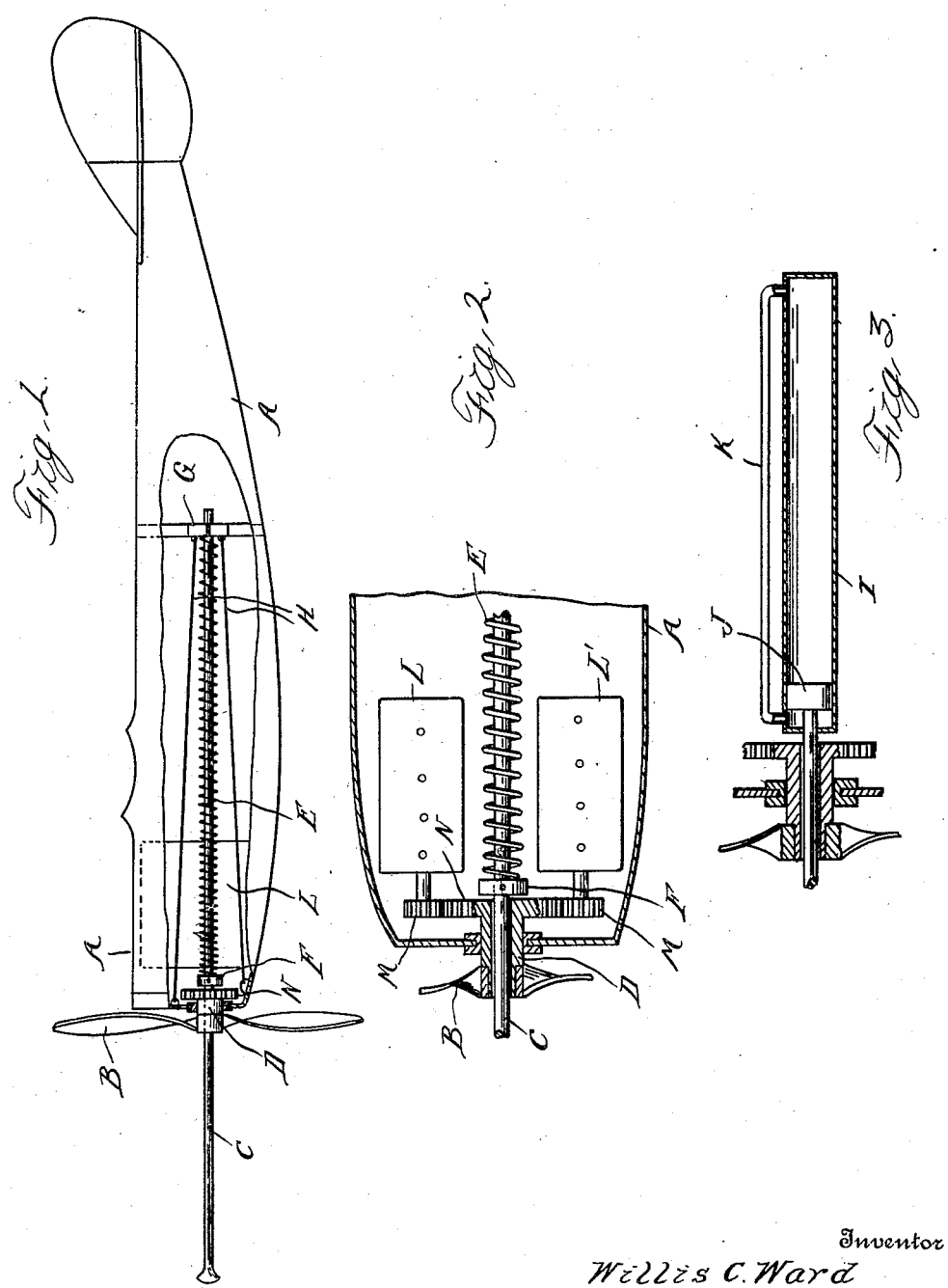

Patented July 15, 1930

1,770,638

UNITED STATES PATENT OFFICE

WILLIS C. WARD, OF ORCHARD LAKE, MICHIGAN

BUFFER FOR AIRCRAFT

Application filed January 9, 1928. Serial No. 245,587.

The invention relates to means for cushioning the fall of aeroplanes or other aircraft and the invention consists in the novel construction as hereinafter set forth.

In the drawings;

Figure 1 is a sectional side elevation of an aeroplane to which my improvement is applied.

Figure 2 is a plan partly in horizontal section.

Figure 3 is a longitudinal section through a modified construction.

Where an aeroplane becomes disabled or gets out of control it is quite usual for it to descend head first in what is generally known as a tail spin. With this in view I have devised a construction of buffer which projects forward from the fuselage and is adapted to absorb a portion of the shock before the body of the plane comes in contact with the earth. Inasmuch, however, as it is usual to propel the plane by a tractor arranged forward of the fuselage it is necessary to provide a construction which will avoid interference with such tractor. This I have accomplished by providing the tractor with a hollow hub through which the buffer rod is passed to project forward of the machine. The shock absorbing means is arranged in rear of the tractor and is located in the fuselage or any other convenient place.

As specifically illustrated in the drawings, A is the fuselage and B the tractor arranged at the forward end thereof. The wings may be arranged in the usual relation to the fuselage and I have therefore omitted showing the same.

C is a buffer rod which passes axially through a hollow hub D of the tractor and projects forward and rearward therefrom. The rear portion of the rod C is suitably arranged within the fuselage in a position to avoid interference with the operator in the cockpit. It is also provided with shock absorbing means which as shown in Figures 1 and 2 is formed by a spring E sleeved about the rod C having its forward end bearing against the collar F on said rod and its rear end against an abutment G firmly anchored by braces H to the main frame. The rod C passes through an aperture in the abutment G and the arrangement is such that whenever the forwardly projecting portion of the rod C strikes an obstacle it will be forced rearward through the hollow hub D compressing the spring E and thereby checking the velocity of the machine.

In place of the spring E any other suitable shock absorbing means may be used such, for instance, as shown in Figure 3 in which I is a cylinder containing a fluid either liquid or gaseous. J is a piston on the end of the rod C engaging said cylinder and K is a restricted by-pass for the fluid extending from one end of the cylinder to the other. With this construction the rearward movement of the rod C will be retarded by the fluid which on account of the restricted by-pass requires time for its displacement.

It is obvious that other means may be employed for accomplishing the same purpose but with all constructions the buffer rod extends in advance of the falling machine so as to first come in contact with the earth and through the shock absorbing means retarding the velocity and breaking the fall.

To avoid interference between the rod C and the engine which drives the propeller I preferably provide an offset driving connection such as shown in Figure 2 in which L and L' are two engines arranged upon opposite sides of the axis of the tractor and connected thereto by the gear wheels M which are in mesh with the gear wheel N on the hub D.

What I claim as my invention is:

1. In an aeroplane, the combination with a tractor, of a hollow hub therefor, a rod passing through said hollow hub and projecting forward therefrom and shock absorbing means operatively connected to said rod in rear of said hub.

2. In an aeroplane, the combination with a tractor, of a hollow hub therefor, a rod passing through said hollow hub and projecting forward therefrom, a spring sleeved on said rod in rear of said hollow hub, a collar on said rod abutting against said spring and an abutment for the rear end of said spring anchored to the frame of the machine.

3. In an aeroplane, the combination with a tractor, of a hollow hub therefor, a motor having a laterally offset driving connection with said hub, a rod passing through said hollow hub and projecting forward therefrom, and shock absorbing means engaging said rod and rear of said hollow hub.

4. In an aeroplane, the combination with a tractor, of a rod projecting forward and in line of the axis of said tractor, shock absorbing means in rear of said tractor and a connection between said rod and shock absorbing means which avoids interference with said tractor.

In testimony whereof I affix my signature.

WILLIS C. WARD.